4553

United States Patent [19]

Stokes

[11] 3,778,716

[45] Dec. 11, 1973

[54] COHERENT CATV TRANSMISSION SYSTEM

[75] Inventor: Lyle S. Stokes, Hollywood, Calif.

[73] Assignee: Hughes Aircraft Company, Culver City, Calif.

[22] Filed: Aug. 25, 1971

[21] Appl. No.: 174,742

Related U.S. Application Data

[63] Continuation-in-part of Ser. No. 523,653, Jan. 28, 1966, Pat. No. 3,619,782.

[52] U.S. Cl. .................. 325/49, 325/63, 325/308, 178/DIG. 13

[51] Int. Cl. .................. H04b 1/68, H04h 1/00

[58] Field of Search .................. 178/DIG. 13; 179/15 BP, 15 BS, 15 FS, 15 BD, 15 BY; 343/200, 207, 208; 325/31, 3, 49, 50, 308, 329, 63; 332/40, 44, 45

[56] References Cited

UNITED STATES PATENTS

| | | | |
|---|---|---|---|
| 3,084,328 | 4/1963 | Groeneveld et al. | 325/50 X |
| 3,201,691 | 8/1965 | Lyon | 179/15 BD |
| 2,710,343 | 6/1955 | Thompson | 325/3 X |
| 3,182,131 | 5/1965 | Barnes | 179/15 BP |
| 3,182,132 | 5/1965 | Barnes | 179/15 BP |

*Primary Examiner*—Benedict V. Safourek
*Attorney*—W. H. MacAllister, Jr. et al.

[57] ABSTRACT

A community antenna television system wherein one or more microwave transmission links are used between the CATV receiving unit and the user's receivers. In accordance with the invention, the undesirable effects caused by slight frequency differences between the directly-transmitted television signals and the relayed television signals are eliminated. This is accomplished by providing at the microwave transmitter a pilot signal having a frequency which is an integral submultiple of the microwave carrier frequency. This pilot signal is transmitted, together with the television broadcast signals over the microwave transmission link or links. At the microwave receiver the pilot signal, together with an integral submultiple of the local oscillator, is utilized in a phase-locked loop to synchronize the local oscillator frequency with the microwave carrier frequency.

9 Claims, 8 Drawing Figures

COHERENT CATV TRANSMISSION SYSTEM

CROSS-REFERENCE TO RELATED APPLICATION

The present application is a continuation-in-part of copending application Ser. No. 523,653, filed Jan. 28, 1966, now U.S. Pat. No. 3,619,782.

FIELD OF THE INVENTION

This invention relates to high-frequency communications systems and more specifically to television relay systems.

DESCRIPTION OF THE PRIOR ART

Because of the particular propagation characteristics of electromagnetic waves in the VHF and UHF regions, television broadcast receivers in many geographic areas are unable to provide images of acceptable quality. These areas are those which, for reasons of distance or surrounding topography, are unable to obtain sufficiently strong, distortionless signals directly from the main broadcast transmitters. In order to fill this gap in coverage and to provide signals to television viewers who are ordinarily unable to obtain suitable reception, community antenna television systems have been employed.

Such systems, frequently termed CATV systems, generally employ an antenna or antennas advantageously located in a strong signal area to receive the transmitted signals. These signals are then relayed by suitable means to the receivers of users in the areas of poor reception. If the distance over which the received signal is to be relayed is sufficiently small, a coaxial cable can be advantageously utilized as the transmission medium for the relayed signal. Frequently, however, it may be inconvenient or impractical to utilize coaxial cable as the sole transmission medium for the relayed signal. For example, the distances separating the users and the CATV receiving unit may be so great as to prevent the economical utilization of coaxial cable. Furthermore, the impracticality of utilizing underground conduit or overhead poles within a metropolitan area may weight against the use of coaxial cable transmission media even though the physical distances involved are relatively small. In such instances it is desirable to utilize one or more microwave transmission links in the relay path between the CATV system receiving unit and the users' receivers.

When microwave transmission links are utilized, however, it then becomes necessary to translate the relatively low-frequency UHF or VHF to television signals into corresponding signals in the higher-frequency microwave region. Although the relayed television signals can be transmitted over the microwave links by utilizing subcarriers and conventional double-sideband AM or FM modulation techniques, the present invention contemplates the utilization of single-sideband amplitude modulation. As is well-known, in single-sideband microwave transmission, it is customary to eliminate the carrier at the microwave transmitter and to supply it again locally at the receiver. In this manner, only half the frequency spectrum of ordinary double-sideband transmission is required. At the microwave receiving station it is then necessary to reconvert the signals to frequencies within the television broadcast band for transmission to the users' receivers.

For practical reasons, it is generally desirable that the television signals thus relayed occupy the same frequency channels as originally transmitted from the respective broadcast stations. However, an additional problem arises when this is attempted. This problem is attributed to the beat frequency which occurs because of the slight frequency differences between the relatively weak television carrier signal from the broadcast transmitter and the reconverted carrier signal from the CATV microwave receiving unit.

For example, if the carrier frequency of the originally transmitted television signal is designated $f_c$, then the carrier frequency of the relayed signal should also be $f_c$. In order to accomplish this end in a single-sideband transmission system, however, it is necessary to provide a local oscillator signal which is synchronized in frequency and phase with the non-transmitted microwave carrier. Ordinarily, the local oscillator signal at the microwave will depart from the desired frequency by some small amount. This, in turn, will cause the carrier frequency of the relayed television signal to depart from the desired frequency by the same small amount, $\pm\Delta f$. Thus, it is seen that if the transmitted signal of frequency $f_c$ is of a sufficiently high level at the user's receiver it can mix with the relayed signal to produce a beat frequency signal at $\Delta f$ which ordinarily manifests itself as horizontal bars on the viewing screen of the user's receiver. Such interference is sometimes, although inaccurately, termed "co-channel interference". An obvious method for minimizing the undesirable effects of this difference in frequency is to provide a good electromagnetic shield around the user's receiver. Where only a small number of users are so affected, such a solution may not be too undesirable. However, where many users are affected, such a solution would be both costly and inconvenient.

Accordingly, it is an object of the present invention to provide an improved CATV system which provides a simple and economical means for minimizing the effects of frequency differeces between the transmitted and relayed signals.

It is another object of the present invention to provide an improved CATV transmission system in which the frequencies of the relayed signals are substantially identical to the frequencies of the respective transmitted signals.

SUMMARY OF THE INVENTION

In accordance with the principles of the present invention these objects are accomplished by providing, at the microwave transmitter, an auxiliary or pilot signal having a frequency which is an integral submultiple of the microwave carrier frequency. This pilot signal is transmitted, together with the television broadcast signals, over the microwave link or links. At the microwave receiver the pilot signal, together with an integral submultiple of the local oscillator, is utilized in a phase-locked loop to synchronize the local oscillator frequency with the non-transmitted microwave carrier frequency. In this manner the demodulated television broadcast (i.e. relayed) signals will have precisely the same frequency as the originally transmitted signals.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
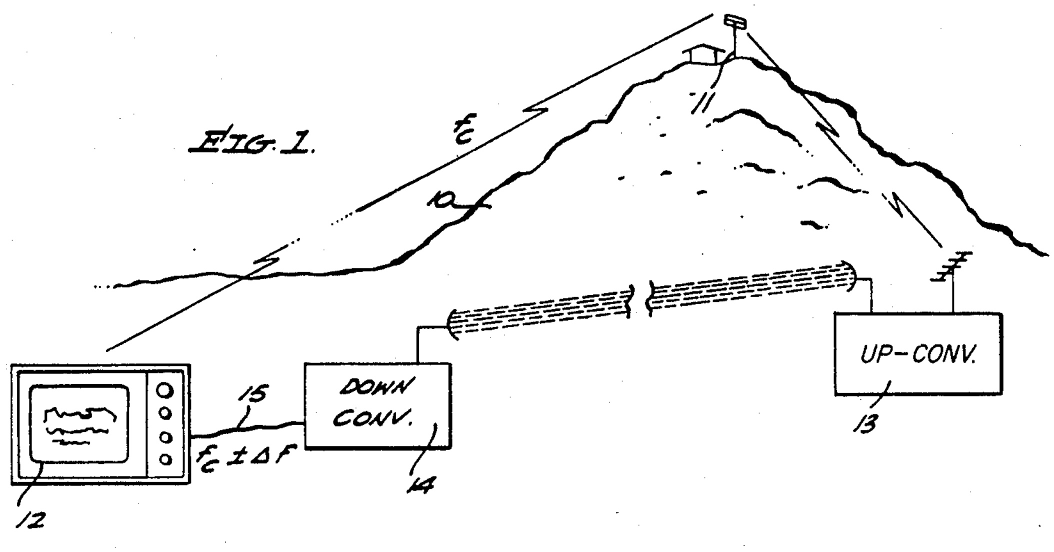
FIG. 1 is a simplified pictorial view of a typical CATV relay arrangement included to facilitate explanation of the present invention.

Referring more specifically to the drawings, FIG. 1 is a pictorial view of a typical CATV system. In FIG. 1 a television broadcast transmitter, situated, for example, on a mountain or hill 10, radiates the television broadcast signal on a carrier frequency $f_c$ from an antenna 11. Remote from the television transmitter location is a user's receiver 12. It is assumed, as mentioned above, that the user is located in a region which, because of distance or surrounding topography, is considered an area of poor reception.

In order to improve the quality of the user's reception, a CATV relay link comprising frequency translator or up-converter 13, a microwave relay path, a down-converter 14, and low-frequency transmission link 15 is utilized. Typically, in order to obtain a high quality signal from the broadcast transmitter, up-converter 13 utilizes a receiving antenna disposed in a region of relatively high signal strength. The received television signal is then translated to a frequency within the microwave region and transmitted over the microwave relay path to down-converter 14. At down-converter 14 the television signal is again converted to a frequency as close as possible to the transmitted signal frequency $f_c$, whereupon it is relayed to user's set 12 over low-frequency transmission link 15. The signal produced by the down-converter 14 is herein called the relayed signal. In general, low-frequency transmission link 15 can comprise coaxial cable or other suitable transmission media known in the art. Although only one television broadcast transmitter is shown in the pictorial view of FIG. 1, it is understood that this is merely for the sake of explanation, since it is well-known that a number of metropolitan areas have many local television broadcast stations. Therefore, although the present invention will be described in terms of a single television signal having a carrier frequency $f_c$, it is recognized that the description applies equally well to a plurality of simultaneously transmitted televison signals, each having their own video and audio carrier frequencies.

As mentioned above, in a CATV system utilizing typical single-sideband amplitude modulation in the microwave link, the carrier frequency of the relayed television signal will differ somewhat from the carrier frequency of the originally transmitted television signal. In other words, the relayed television signal will generally have a carrier frequency equal to $f_c \pm \Delta f$. The difference frequency $\Delta f$ between the originally transmitted carrier frequency and the relayed signal carrier frequency may be decreased by utilizing a carefully controlled local oscillator circuit in the down-converter 14. However, even the most carefully controlled local oscillator is subject to slight frequency drifting.

Figure 2:
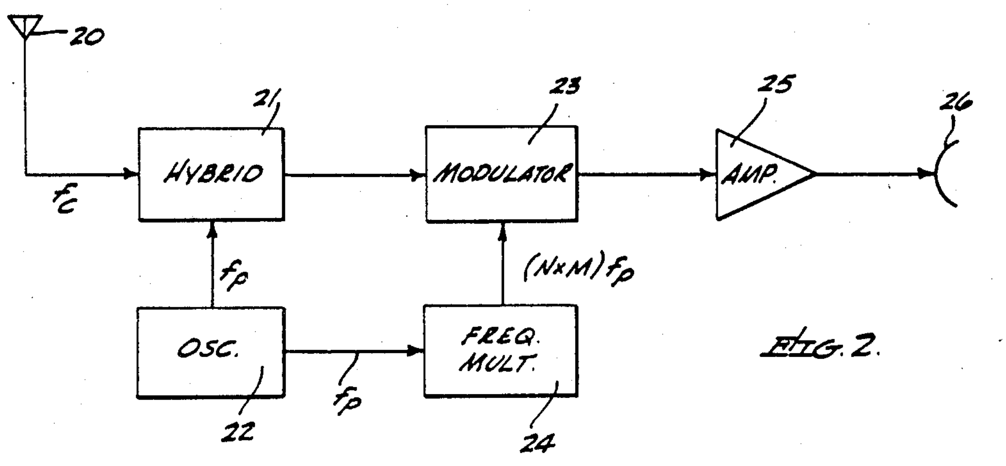
FIG. 2 is a block diagram of one microwave up-converter arrangement utilized in practicing the present invention.

In accordance with the present invention, the carrier frequencies of the relayed signals are synchronized with the carrier frequencies of the originally transmitted signals by utilizing a pilot signal transmitted along with the television signals over the microwave transmission path. In FIG. 2 there is shown a simplified block diagram of an up-converter circuit utilized in such a system.

In FIG. 2 a receiving antenna 20 is adapted to receive the directly transmitted television signals from the television broadcast transmitters. For the purpose of illustration, it will be assumed that only one television signal having a carrier frequency $f_c$ is received at antenna 20. As mentioned above, however, there can be many received signals, each having its own video and audio carrier frequencies. In any event, the received signal is coupled from receiving antenna 20 to a hybrid network 21 where it is combined with a pilot signal having a frequency $f_p$ generated by an oscillator 22.

In general, the oscillator 22 can comprise a crystal controlled circuit or other oscillator circuit known in the art capable of generating a stabilized frequency output. By the same token, hybrid network 21 can comprise any suitable broadband hybrid network operable in the VHF and UHF television broadcast regions. The exact frequency range of the various circuit elements depend, of course, on the frequencies of the television signals to be relayed. Furthermore, the frequency $f_p$ of the pilot signal is preferably chosen so that it lies in an unoccupied region of the television broadcast band. For example, in the VHF commercial television band $f_p$ can correspond to a frequency between 72 and 76 megacycles per second, which range has not been allocated for television usage. With the exception of possible frequency restrictions placed upon the microwave carrier frequency, to be discussed hereinbelow, the exact frequency $f_p$ of the pilot signal is not critical.

The combined television and pilot signals are coupled out of the hybrid network 21 and fed as a modulating input signal to a modulator 23. A portion of the pilot signal from the oscillator 22 is also coupled to a pilot signal multiplier circuit 24 which multiplies the frequency by a predetermined ratio designated $(N \times M)$, where N and M are integers, and produces a microwave signal having a frequency $(N \times M) f_p$. This microwave signal is then coupled to modulator 23 where it is modulated by the signals from the hybrid network 21. The resultant modulated microwave signal is then coupled to a microwave amplifier 25 and fed to a microwave transmitting antenna 26. Amplifier 25, for example, can comprise a traveling wave tube or other suitable microwave amplifying device known in the art.

In the up-converter of FIG. 2, modulator 23 is shown to be one capable of converting, en masse, the entire spectrum of received television signals to the microwave region. Thus, if the up-converter is intended for operation only in the commercial VHF television region the frequency range of modulator 23 should be from approximately 50 megacycles per second to somewhat over 200 megacycles per second. One device which is capable of such operation is disclosed in U.S. Pat. No. 3,553,584 which issued to B. L. Walsh, Jr. on Jan. 5, 1971.

The net operational effect of the up-converter of FIG. 2 can thus be summarized as one of combining a pilot signal with the relatively low-frequency television signals and converting the combined signals to the microwave region. Furthermore, the carrier frequency of the resultant modulated microwave signal, although not transmitted, is an integral multiple of the pilot signal. In order to achieve carrier suppression in an up-converter such as shown in FIG. 2, appropriate filters can be utilized at the output of the modulator 23.

Figure 3:
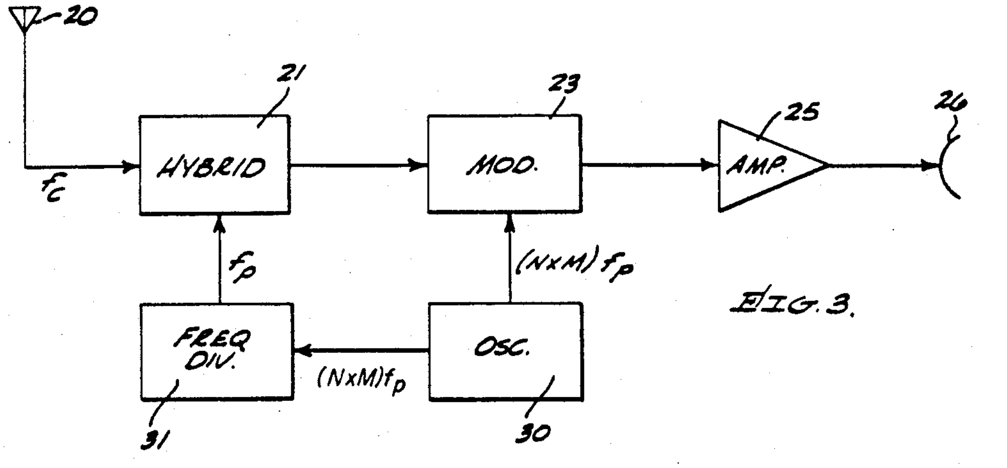
FIG. 3 is a block diagram of an alternative up-converter arrangement.

The frequency translation mentioned above can also be accomplished by the alternate up-converter configuration shown in block diagram form in FIG. 3. In FIG. 3 corresponding numerals have been carried over from FIG. 2 to designate like circuit elements. Instead of an oscillator operating at the pilot frequency $f_p$ the embodiment of FIG. 3 utilizes a microwave oscillator 30 generating a microwave output signal at a frequency (N × M) $f_p$. The pilot signal is then obtained by a frequency divider circuit 31 which divides the oscillator output frequency by a factor (N × M). Thus the pilot signal and the carrier signal are obtained as in the translator of FIG. 2 but by utilizing a different circuit combination.

The operation of the embodiment of FIG. 3 is substantially identical to that of FIG. 2. That is, the incoming television signals received at antenna 20 are combined with the pilot signal at hybrid network 21 and coupled into modulator 23. At modulator 23 these signals are utilized to modulate the carrier signal from oscillator 30. The modulated microwave signal is then amplified and coupled to transmitting antenna 26. This modulated signal is then transmitted through space or through other microwave transmission media and intercepted by a microwave receiver or down-converter such as those described hereinbelow.

Figure 4:
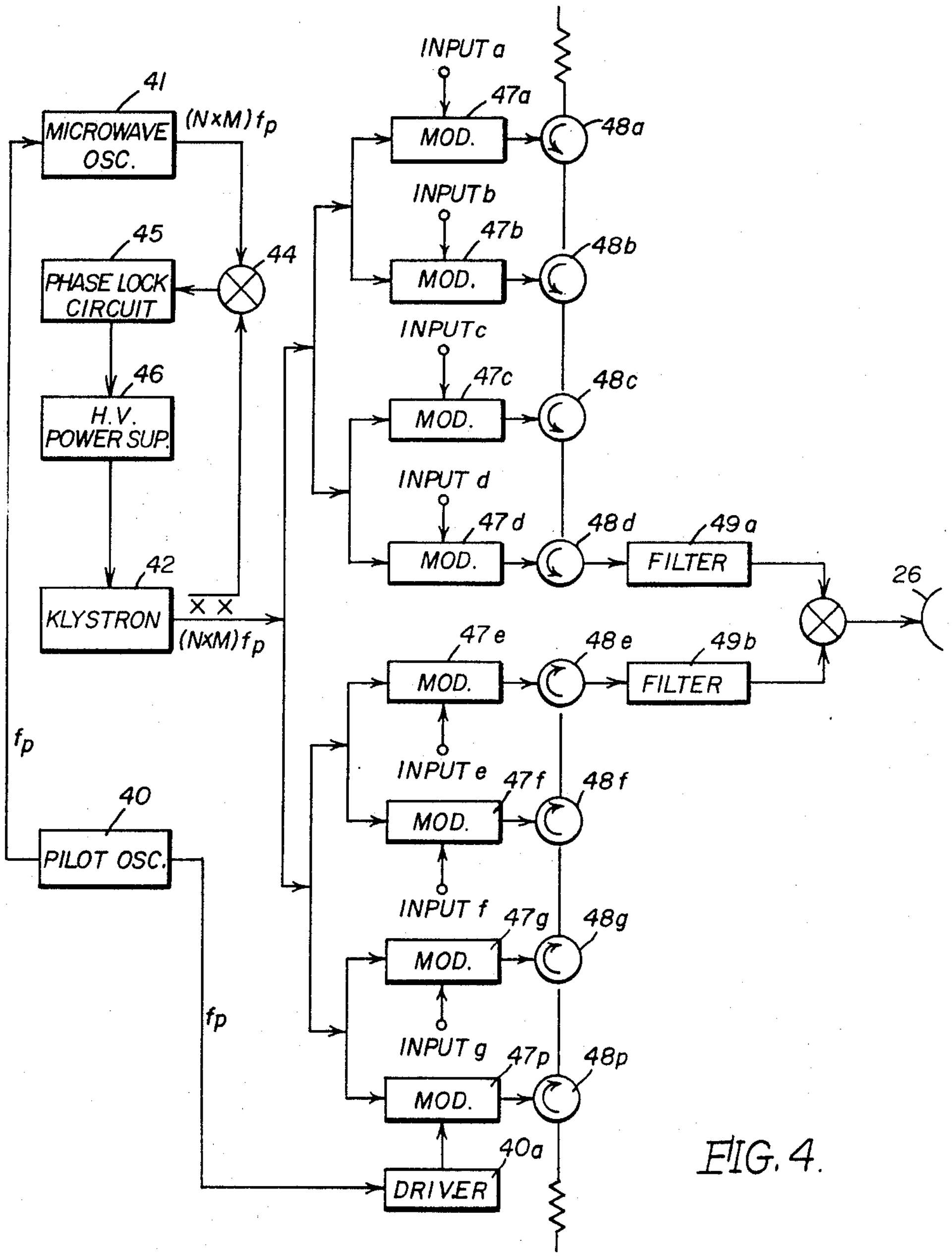
FIG. 4 is a block diagram of a portion of another alternative up-converter arrangement.

In FIG. 4 there is shown in block diagram another embodiment of an up-converter. In the embodiment of FIG. 4 the information-containing signals and the pilot signal are up-converted to the microwave region and then combined.

In the embodiment of FIG. 4, a pilot oscillator 40, which is preferably crystal controlled, provides an output signal at the pilot frequency $f_p$. The pilot oscillator is coupled to a microwave oscillator 41 which can also include one or more stages of frequency multiplication. The output of the microwave source is phase-locked to the pilot frequency $f_p$ and provides an output at (N × M) $f_p$. A klystron 42 having an output frequency nominally at (N × M) $f_p$ provides the high power microwave energy for the up-converter. A portion of the klystron output is sampled by means of a directional coupler 43 and applied, together with the output of microwave oscillator 41 through a summing network 44 to a phase-lock circuit 45. An output of the phase-lock circuit 45 is coupled to a high voltage power supply 46 which, in turn, provides the high voltage dc power required by klystron 42.

The high power microwave output of kylstron 42 is split by means of appropriate power-dividing techniques known in the art and applied as separate inputs to a plurality of modulators 47*a*, 47*b*, 47*c*, 47*d*, 47*e*, 47*f*, 47*g*, and 47*p*. Each of these modulators, with the exception of 47*p*, is provided with a signal input designated inputs *a* through *g*, respectively. These inputs are derived from modulator drivers operating at frequencies corresponding to the VHF or UHF television channels to be transmitted. The separate inputs can be obtained from individual VHF or UHF head-end receivers as mentioned hereinbelow, or from a single broadband receiver with appropriate frequency selective output filters. The pilot frequency from pilot oscillator 40 is applied by means of a separate driver circuit 40*a* to modulator 47*p*. In general, modulators 47*a* through 47*p* each include a bandpass filter which eliminates from their respective outputs all frequencies except the desired sideband.

The outputs of each of the modulators 47*a* through 47*p* are coupled to circulators 48*a* through 48*p*, respectively. The outputs of circulators 48*a* through 48*d* are combined serially and coupled through a first harmonic filter 49*a* and summing cricuit to a transmitting antenna 26. Similarly, the outputs of circulators 48*p* through 48*e* are serially combined and coupled through a second harmonic filter 49*b* through the summing circuit to antennas 26. In the alternative, the outputs of harmonic filters 49*a* and 49*b* can each be coupled to one input arm of a hybrid network such as magic-T. The output arms of the hyrid network can then be coupled to appropriate antenna feed means.

In operation, pilot oscillator 40, as in the case of the embodiment of FIG. 2, provides both the pilot signal and a signal which is an integral submultiple of the microwave carrier. In the case of the embodiment of FIG. 4, however, the pilot frequency $f_p$ serves to phase-lock a separate oscillator 41 which, as noted above, can include one or more frequency multiplier circuits. It is apparent that microwave oscillator 41 can itself be replaced by a frequency multiplier as in the case of the embodiment of FIG. 2.

The high power microwave carrier source which comprises klystron 42 is also synchronized in phase and frequency with the multiple (N × M) of the pilot frequency $f_p$ by means of the phase lock circuit 45 and controllable high voltage power supply 46. The various television signals to be relayed are received and processed and applied as input signals to the inputs *a* through *g* of modulators 47*a* through 47*g*, respectively. These signals are converted to subcarriers in the microwave region by means of modulators 47*a* through 47*g*. As mentioned above, these modulators also include selective output filters which pass only the desired sideband and attenuate the carrier signals. The information-containing subcarriers and the pilot signal subcarrier are then combined by means of circulators 48a through 48*p*, filters 49*a* and 49*b* and the summing network and fed to transmitting antenna 26.

The up-converter circuit shown in FIG. 4 thus accomplishes the same end as do the circuits of FIGS. 2 and 3. It is seen, however, that the combination of the pilot signal with the information-containing signals occurs after frequency conversion rather than prior to frequency conversion as in the previous embodiments.

Figure 5:
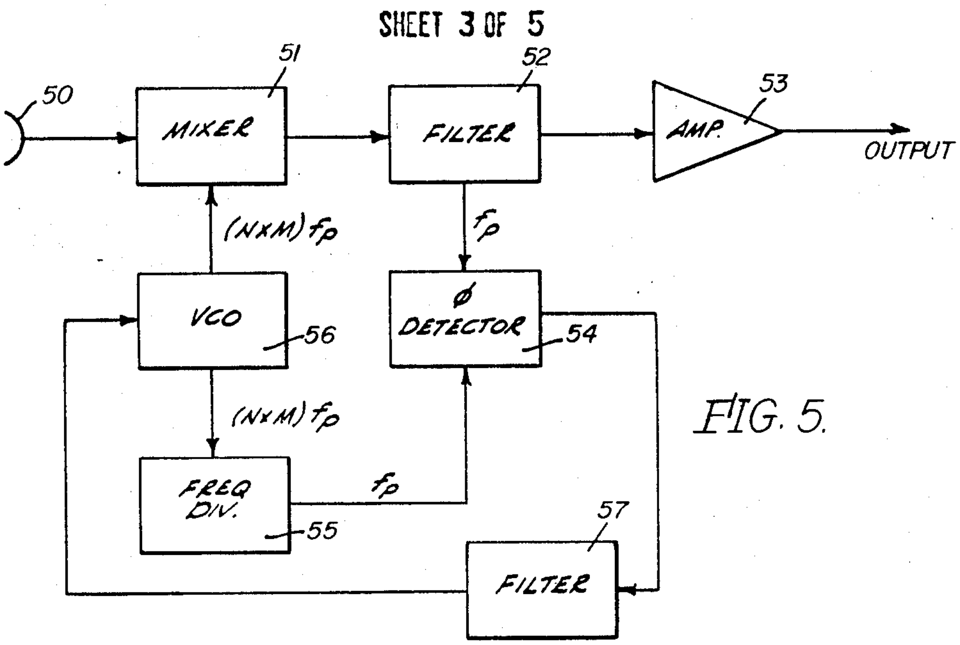
FIG. 5 is a block diagram of one microwave down-converter in accordance with the present invention.

In FIG. 5 there is shown a simplified block diagram of one microwave receiving circuit hereinafter referred to as a down-converter. The circuit of FIG. 5 comprises an antenna 50 adapted to receive the modulated microwave signal from the up-converter. Antenna 50 is coupled to a mixer circuit 51, the output of which in turn is coupled to a filter circuit 52. Filter circuit 52 functions to separate the pilot signal at frequency $f_p$ from the television signal at frequency $f_c$. The television signal is then coupled out of filter circuit 52 to a wideband amplifier 53 and then to a relatively low-frequency transmission system, such as coaxial cable, for distribution to the users' receivers.

In accordance with the principles of the invention, the carrier frequencies of the television signals so distributed are locked to the carrier frequencies of the television signals as originally transmitted. This is accomplished in the down-converter of FIG. 5 by coupling the pilot signal at frequency $f_p$ from filter 52 to a phase detector circuit 54. A comparison signal at a frequency substantially equal to $f_p$ is applied as an input to phase detector 54. This comparison signal is obtained from a frequency divider circuit 55 which derives its input from a voltage controlled oscillator circuit 56 operating at the local oscillator frequency $(N \times M) f_p$ in the microwave region. An error signal proportional to the phase difference between the pilot signal and the comparison signal is applied to the voltage controlled oscillator 56 through a low pass filter 57 to control the local oscillator frequency thereof.

In operation, the microwave signal comprising the television signals and pilot signal is received at antenna 50. The local oscillator signal, together with this microwave signal, is combined in mixer 51 to yield a detected output signal which comprises the pilot signal and television signals in the relatively low-frequency television broadcast region. The phase-locked loop comprising phase detector 54, frequency divider 55, voltage controlled oscillator 56, and low pass filter 57 serves to maintain a local oscillator frequency equal to the frequency of the microwave carrier. Thus the television output signals from the receiver are of precisely the same frequencies as those originally transmitted by the respective television broadcast transmitters.

Figure 6:
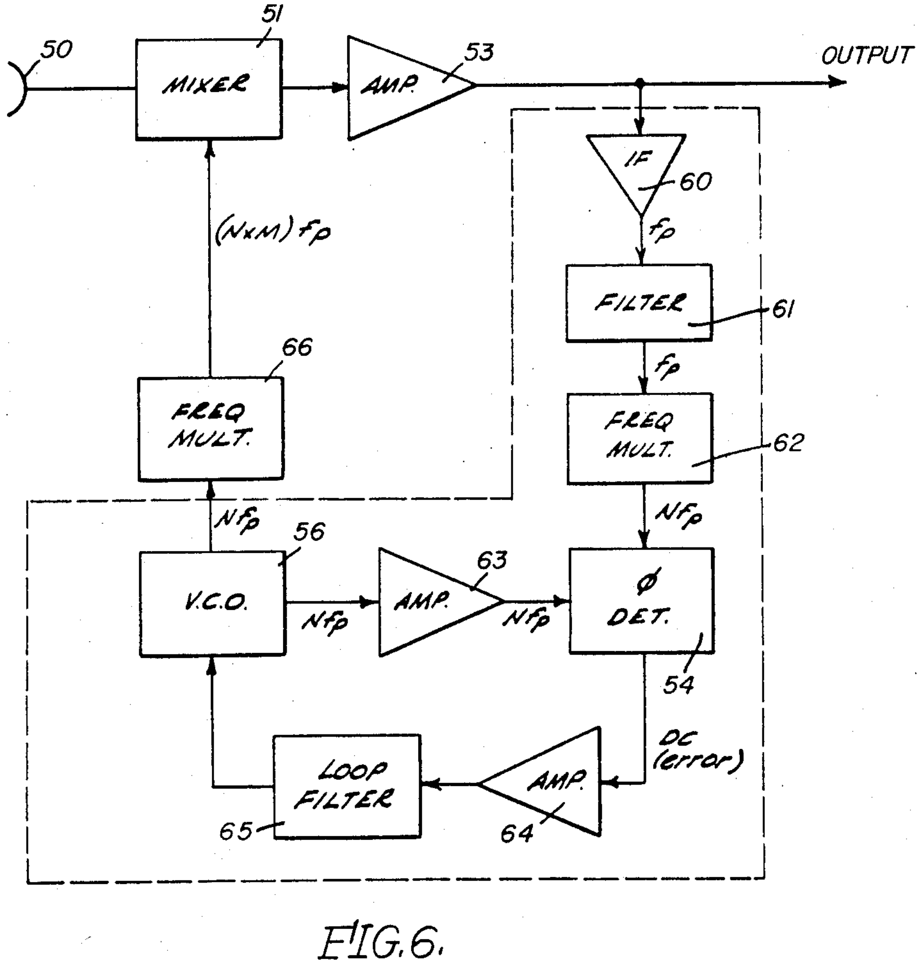
FIG. 6 is a block diagram of an alternative down-converter arrangement.

In FIG. 6 there is shown in more specific block diagram form, an alternative down-converter in accordance with the present invention. Where appropriate, like numerals have been carried over from FIG. 5 to designate like circuit elements. The down-converter of FIG. 6 comprises a mixer 51 wherein the microwave signal from receiving antenna 50 is "beat down" by the local oscillator signal to yield television signals and a pilot signal in the television broadcast frequency region. The output of mixer 51 is, as before, applied to a wideband amplifier 53 which amplifies the television signals before distribution to the users' receivers. A portion of the output signal from amplifier 53 is coupled to an intermediate frequency amplifier 60 which amplifies the pilot signal at frequency $f_p$. Intermediate frequency amplifier 60 can be followed by a selective filter circuit 61 if further attenuation of signals at frequencies other than the pilot frequency $f_p$ is desired.

The amplified pilot signal is then coupled to a first frequency multiplier circuit 62 which furnishes an output signal having a frequency $Nf_p$, which is an integral multiple of pilot frequency $f_p$. The factor N can, if desired, be unity in which case frequency multiplier 62 can be omitted. In any event, the amplified and multiplied pilot signal is then applied as one input to phase detector 54. A comparison signal also at frequency $Nf_p$ is provided by voltage controlled oscillator 56 through a buffer amplifier 63. The detected output of phase detector 54 is then coupled as an error signal to voltage controlled oscillator 56 via a feedback loop comprising the serial combination of an amplifier 64 and loop filter 65. As in the embodiment of FIG. 5, the error signal is utilized to maintain the phase and frequency of oscillator 56 at the desired submultiple of the carrier frequency. This stabilized oscillator signal at frequency $Nf_p$ is then applied to a second frequency multiplier circuit 66 which multiplies the oscillator frequency by a factor M to produce the local oscillator signal at frequency $(N \times M) f_p$. The output of frequency multiplier 66 is then applied to mixer 51 to mix with the received modulated microwave signal as mentioned above.

Many specific circuits can be readily devised by those skilled in the art to realize the up-converters and down-converters shown in block diagram in the preceding figures. In order that the invention may be more expeditiously carried into effect, however, a portion of the down-converter of FIG. 6 is shown more specifically in schematic diagram form in the above-referenced copending application Ser. No. 523,653.

In some instances it may be undesirable to utilize a separate pilot signal for synchronizing the carrier frequencies at the microwave receiver. By appropriate modification of the up-converter and the down-converter a television carrier can itself serve as the pilot signal. This feature is especially useful in CATV systems which employ one or more "local origination channels" as they are commonly known. In a system such as this the video carrier of a local origination channel can serve also as the pilot signal.

Figure 7:
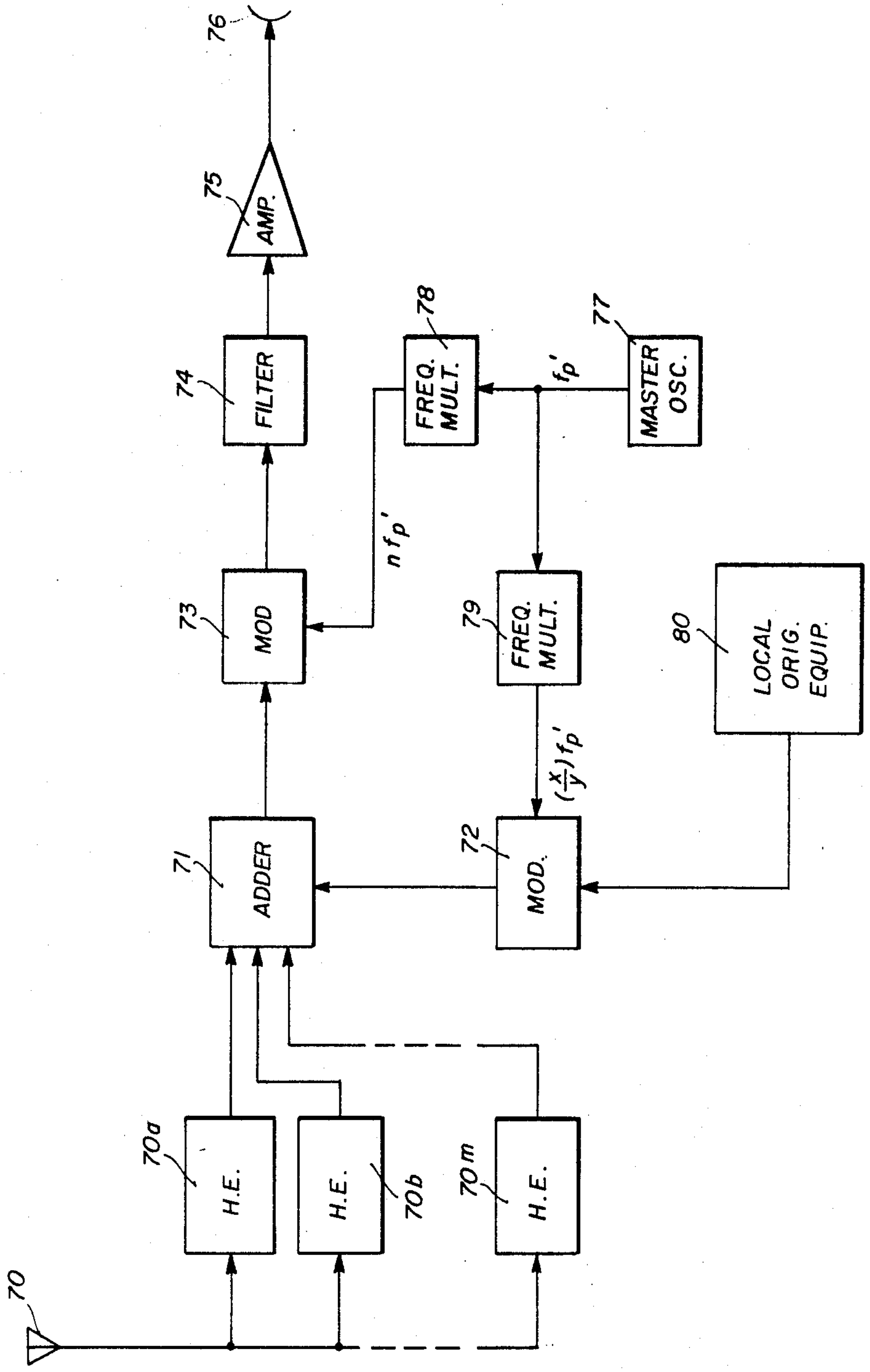
FIG. 7 is a block diagram of a combination transmitter-up-converter which utilizes a television carrier as the pilot signal.

A block diagram of a combination transmitter-up-converter for such a system is shown in FIG. 7. In FIG. 7 a receiving antenna 70 is coupled to a plurality of head-end amplifier-drivers 70*a*, 70*b* . . . 70*m*. The head-end amplifier-drivers serve to amplify and filter the video and audio components of each of the incoming television signals and to provide output signals of a preset amplitude for driving the modulator. The outputs of head-end amplifier-drivers 70*a*, 70*b* . . . 70*m* are coupled to adder circuit 71 where they are combined with the locally generated television signal from modulator 72. The combined signals are coupled to modulator 73, which, for example, can be of the type mentioned in the embodiments of FIGS. 2 and 3. The output of modulator 73 is coupled through single sideband filter 74 to a microwave amplifier 75. Microwave amplifier 75 is, in turn, coupled to transmitting antenna 76.

A master oscillator 77 providing a highly stable r-f signal at a frequency $f_p'$ is coupled through a first frequency multiplier 78 to provide the microwave carrier energy at frequency $nf_p'$ to modulator 73. The output of master oscillator 77 is also coupled to second frequency multiplier 79 having its output coupled to vestigial sideband amplitude modulator 72. Locally generated program information originating from local origination equipment indicated by block 80 is coupled to modulator 72.

The operation of the embodiment of FIG. 7 is similar to that of FIGS. 2 and 3 in that the directly-received television signals from the television broadcast stations are intercepted at receiving antenna 70 and applied through amplifier-drivers 70*a*, 70*b*, . . . 70*m* to adder circuit 71. An unused VHF or UHF channel is selected to serve as the local origination channel. The carrier of the local origination channel which also serves as the pilot signal is obtained from frequency multiplier 79 which is driven by master oscillator 77. The output frequency of multiplier 79 is $(x/y) f'_p$. Where $x$ and $y$ are integers. The video and audio information generated by the local origination equipment 80 is inserted onto the local origination carrier by modulator 72 and applied to adder circuit 71 where it is combined with the directly-received television broadcast signals. The combined signals are then up-converted to the microwave region by modulator 73. The microwave carrier is also obtained by frequency multiplication of the master oscillator output frequency. After modulation, the appropriate microwave sideband is transmitted through single sideband filter 74 amplified and coupled to microwave antenna 76 for transmission over the microwave link. Alternatively, it is noted that the composite local origination carrier-pilot signal can be converted to microwave first and then combined for transmission by apparatus similar to that of FIG. 4.

Figure 8:
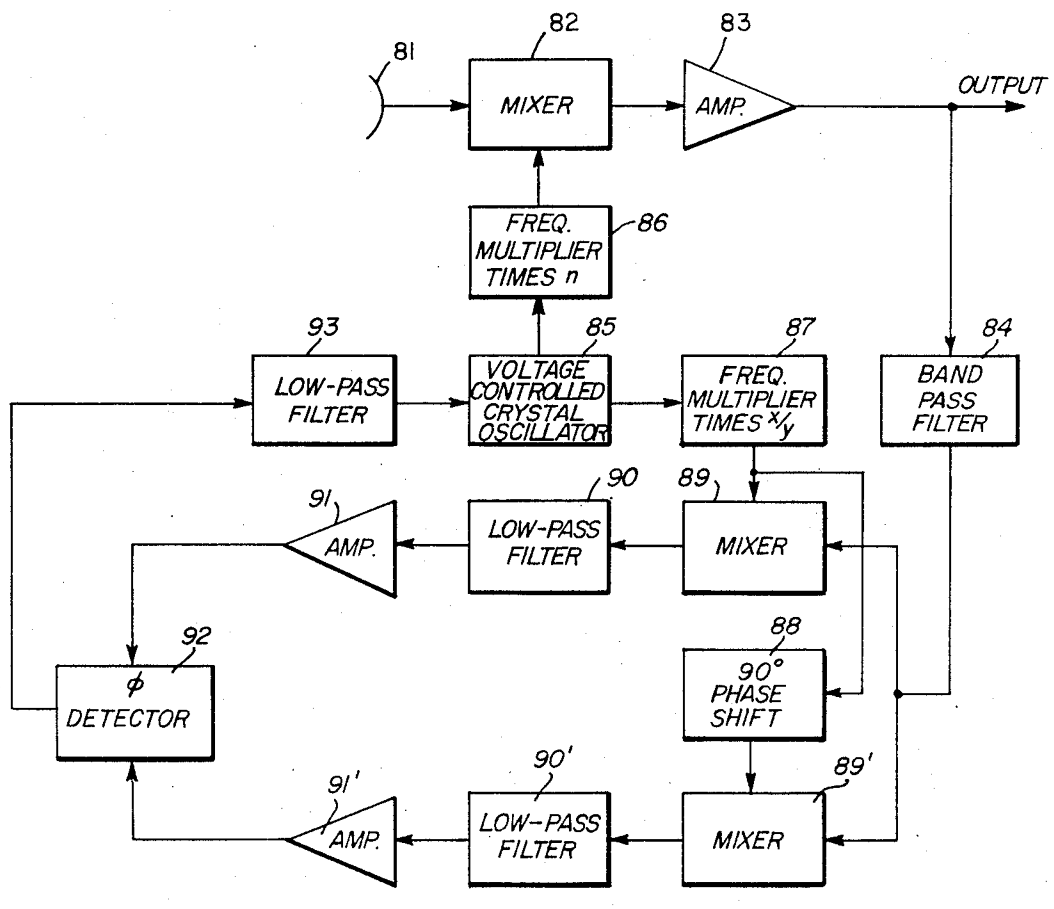
FIG. 8 is a block diagram of a combination receiver-down-converter for use with the embodiment of FIG. 7.

A combination video receiver-down-converter which can be utilized in conjunction with the embodiment of FIG. 7 is shown in the block diagram of FIG. 8. The receiver-down-converter of FIG. 8 comprises a microwave receiving antenna 81 coupled to a first mixer 82. The output of mixer 82 is coupled through a wideband video amplifier 83 to the output of the receiver. A bandpass filter 84 tuned to the frequency of the local origination channel is also coupled to the output of amplifier 83.

A voltage controlled crystal oscillator 85 provides an output frequency which when multiplied by frequency multiplier 86 is coupled to the local oscillator input of mixer 82. Precise frequency and phase synchronization of the voltage controlled crystal oscillator 85 with the master oscillator of the transmitter-up-converter of FIG. 7 is insured by the phase lock circuit. This phase lock circuit comprises oscillator 85, frequency multiplier 87, 90 degrees phase shift network 88, mixers 89 and 89', low pass filters 90 and 90', amplifiers 91 and 91', phase detector 92 and low pass filters 93. This basic phase lock circuit is described in an article entitled "Synchronous Communications" by John P. Costas which appeared in the Proceedings of the IRE, Vol. 44, No. 12, December 1956 at pp. 1713–1718.

The basic circuit was modified by incorporating frequency multiplier 87 in the loop between oscillator 85 and mixers 89 and 89'. Frequency multiplier 87 is included in order to insure that the phase lock loop tracks the received carrier-pilot signal rather than an undesired feedthrough signal inadvertently coupled from the voltage controlled oscillator 85.

In all cases it is understood that the above-described embodiments are merely illustrative of but a small number of many possible specific embodiments which can represent applications of the principles of the present invention. Numerous and varied other arrangements can be readily devised in accordance with these principles by those skilled in the art without departing from the spirit and scope of the invention.

What is claimed is:

1. A television transmission system comprising, in combination:

a first source of rf energy having a given pilot frequency;

a second source of rf energy having a frequency which is an integral multiple of said pilot frequency;

a plurality of modulators each having a carrier input, a signal input, and an output;

means for coupling said second source of rf energy to the carrier inputs of each of said modulators;

means for coupling said first source of rf energy to a signal input of one of said modulators;

a plurality of television signals each having predetermined carrier frequencies within a selected band of frequencies;

means for coupling each of said television signals to a signal input of respective ones of the remaining modulators;

means for coupling the outputs of said modulators to an extended transmission path;

receiving means coupled to said transmission path;

said receiving means including means for reconverting said television signals to frequencies within said selected band, said reconverting means including means responsive to the pilot frequency of said first rf source for synchronizing the carrier frequencies of the reconverted television signals with said predetermined carrier frequencies.

2. The transmission system according to claim 1 wherein said second source of rf energy comprises a phase-locked microwave oscillator.

3. The transmission system according to claim 1 wherein said synchronizing means comprises a phase-locked loop.

4. A television transmission system comprising, in combination:

means adapted to receive television broadcast signals, said signals each having predetermined carrier frequencies within a given band of frequencies;

means for generating a pilot carrier having a frequency within said band;

means for modulating said pilot carrier with video information;

means for combining said modulated pilot carrier with said received television broadcast signals;

means for converting said combined signals to an amplitude modulated single sideband signal in the microwave frequency region, the carrier frequency of said microwave signal being an integral multiple of said pilot carrier frequency;

means for transmitting said microwave signal over an extended signal wave transmission path;

means for receiving said transmitted microwave signal;

means for reconverting said signals to frequencies within said given band, said reconverting means including means responsive to the received pilot carrier for synchronizing the carrier frequencies of said reconverted television signals with said predetermined carrier frequencies; and means for distributing said reconverted synchronized television signals.

5. A television relay transmitter comprising, in combination:

a first source of rf energy having a given pilot frequency;

a second source of rf energy having a frequency which is an integral multiple of said pilot frequency;

a plurality of modulators each having a carrier input, a signal input, and an output;

means for coupling said second source of rf energy to the carrier inputs of each of said modulators;

means for coupling said first source of rf energy to a signal input of one of said modulators;

a plurality of television signals each having predetermined carrier frequencies within a selected band of frequencies;

means for coupling each of said television signals to a signal input of respective ones of the remaining modulators; and means for coupling the outputs of said modulators to an antenna feed means.

6. A television transmission system comprising, in combination:

a first source of rf energy, said rf energy being characterized by a pilot carrier of a predetermined frequency having video information modulated thereon;

a second source of rf energy having a frequency which is an integral multiple of said predetermined frequency;

at least one modulator having a carrier input, a signal input, and an output;

first means for coupling said first source of rf energy to the signal input of said modulator;

second means for coupling said second source of rf energy to the carrier input of said modulator;

third means for coupling the output of said modulator to an extended transmission path;

receiving means coupled to said transmission path;

said receiving means including means for demodulating the received signal, said receiving means further including means for synchronizing the carrier frequency of the demodulated signal with said predetermined frequency.

7. The television relay transmitter according to claim 6 wherein said third means includes a single sideband filter.

8. A television transmission system comprising, in combination:

means adapted to receive television broadcast signals, said signals each having predetermined carrier frequencies within a given band of frequencies;

means for generating a pilot signal having a frequency within said band;

means for translating said television signals and said pilot signal to corresponding signals in the microwave frequency region;

means for combining the translated television signals and translated pilot signal;

means for transmitting said combined signals over an extended signal wave transmission path;

means for receiving the transmitted signals;

means for reconverting the received signals to frequencies within said given band, said reconverting means including means responsive to the received pilot signal for synchronizing the carrier frequencies of said reconverted television signals with said predetermined carrier frequencies; and means for distributing said reconverted synchronized television signals.

9. The television transmission system according to claim 1 wherein said pilot signal comprises a television video carrier.

* * * * *